United States Patent [19]

Yazaki et al.

[11] Patent Number: 5,468,444
[45] Date of Patent: Nov. 21, 1995

[54] PRODUCTION OF ORIENTED THERMOPLASTIC FILMS BY BLOWN-FILM EXTRUSION

[75] Inventors: Takao Yazaki; Masataka Noro; Takashi Matsui; Noriyuki Kobayashi; Hironari Sano; Koji Yamamoto, all of Mie, Japan

[73] Assignee: Mitsubishi Chemical Corporation, Tokyo, Japan

[21] Appl. No.: 250,613

[22] Filed: May 27, 1994

[30] Foreign Application Priority Data

Aug. 23, 1993 [JP] Japan .................................. 5-227804

[51] Int. Cl.⁶ .................................................. B29C 55/28
[52] U.S. Cl. ............................ 264/566; 264/514; 264/568; 264/569; 425/72.1; 425/326.1
[58] Field of Search ........................ 264/566, 569, 264/568, 565, 564, 514; 425/72.1, 326.1, 387.1, 388

[56] References Cited

U.S. PATENT DOCUMENTS

| | | | |
|---|---|---|---|
| 3,167,814 | 2/1965 | Corbett | 264/569 |
| 3,307,218 | 3/1967 | Reifenhauser | 425/72.1 |
| 3,507,006 | 4/1970 | Princen | 425/326.1 |
| 4,259,047 | 3/1981 | Cole | 425/387.1 |
| 4,330,501 | 5/1982 | Jones et al. | 264/566 |
| 4,399,094 | 8/1983 | Fujitani et al. | 264/566 |
| 4,447,387 | 5/1984 | Blakeslee et al. | 264/566 |
| 4,624,823 | 11/1986 | Audureau et al. | 264/566 |
| 4,818,467 | 4/1989 | Audureau et al. | 264/564 |
| 5,296,304 | 3/1994 | Yazaki et al. | |

FOREIGN PATENT DOCUMENTS

| | | | |
|---|---|---|---|
| 0544098 | 6/1993 | European Pat. Off. | |
| 2256942 | 5/1974 | Germany | 425/326.1 |
| 9202272 | 6/1992 | Germany | |
| 54-5425 | 3/1979 | Japan | 425/326.1 |
| 62-46337 | 6/1980 | Japan | |
| 59-39524 | 3/1984 | Japan | 425/326.1 |
| 61-94740 | 5/1986 | Japan | 425/326.1 |
| 62-21521 | 1/1987 | Japan | 264/564 |

OTHER PUBLICATIONS

Patent Abstracts of Japan, vol. 11, No. 78, (M-570), Mar. 10, 1987 and Database WPI, Derwent Publications, AN-86-316194 of JP-61-235128, Oct. 20, 1986.
Patent Abstracts of Japan, vol. 8, No. 180, (M-318), Aug. 18, 1984, JP-59-071825, Apr. 23, 1984.
Patent Abstracts of Japan, vol. 3, No. 133, (C-63), Nov. 7, 1979, JP-54-110276, Aug. 29, 1979.
Database WPI, Derwent Publications, AN-94-186150, JP-6-122150, May 6, 1994.

Primary Examiner—Jeffery R. Thurlow
Attorney, Agent, or Firm—Oblon, Spivak, McClelland, Maier, & Neustadt

[57] ABSTRACT

A process for producing an oriented blown film of a thermoplastic resin by blown film extrusion, carried out by blowing air into an extruded bubble of the resin extruded from a ring die to expand the bubble and cooling the expanded bubble with air from a cooling air ring, wherein blown film extrusion is carried out under such conditions that the ratio of (b) the final diameter of the expanded bubble to (a) the diameter of the bubble at the crystallizing temperature of the thermoplastic resin ((b)/(a)) ranges from 1.5 to 10. The process provides an oriented blown film excellent in strength, appearance, and heat shrinkage characteristics.

13 Claims, 9 Drawing Sheets

PRODUCTION OF ORIENTED THERMOPLASTIC FILMS BY BLOWN-FILM EXTRUSION

BACKGROUND OF THE INVENTION

1. Field of the Invention

This invention relates to blown-film extrusion of thermoplastic resins, such as polyethylene, polypropylene, linear low-density polyethylene, ethylene-vinyl acetate copolymers, poly-1-butene, ethylene-acrylic acid copolymers, ethylene-alkyl methacrylate copolymers, and polystyrene. More particularly, it relates to blown-film extrusion in which an extruded bubble of the resin is orientated at a temperature below the crystallizing temperature of the resin.

2. Description of the Related Art

Blown-film extrusion of thermoplastic resins is carried out by use of a blown-film extrusion-machine as shown in FIG. 7. In blown-film extrusion machine 1, starting thermoplastic resin c is stored in storage hopper 2. Under instructions from a computer, load cell 3 works in accordance with the blown film take-off speed to feed thermoplastic resin c automatically to feed hopper 4. Thermoplastic resin c is fed from feed hopper 4 to extruder 5 having screw 7 driven by screw motor 6, where it is melt-kneaded and extruded upward from the head of the extruder. Blowing head 9 containing ring die d is provided at the head of extruder 5 in the vertical direction via direct coupling 8. To blowing head 9 is connected inflator (air pump) 12 via pipe 11 having electromagnetic valve 10 so that air is blown into the inside of the extruded resin tube to form tubular bubble e.

Tubular bubble e is then inflated and cooled with air fed from cooling blower 14 through air cooling ring 13 set above blowing head 9.

Tubular bubble e is guided by a pair of guide plates 15 and passed through a pair of nip rolls 17 driven by take-off motor to obtain flattened tube f.

Flattened tube f is introduced into width measuring means 18 in which the flattened width is measured by width sensor 19 and then, while being guided by guide rolls 20, 21, 21, wound up around paper reel g held by reel holder 23 in wind-up 22.

Where the blown film is to be used as a bag-forming film, flattened tube f is wound up around paper reel g as a flat tube. When the blown film is to be used as a flat film, the width of flattened tube f is slit into a desired number of sheets and wound up around the respective paper reel g' held by reel holder 23. The terminology "blow-up ratio" as used in blown-film extrusion means a ratio of a final inner diameter of a blown tube to an outer diameter of a ring die. Thermoplastic resins are generally inflated at a blow-up ratio of from 1.2 to 4.

In the above-illustrated blown-film extrusion, the bubble extruded from a ring die is generally cooled with air fed from cooling blower 14 through air cooling ring 13, whereby bubble e continues to be expanded until it reaches the frost line (F) where it is solidified. The bubble ceases to expand after it passes the frost line and is further processed with its diameter fixed.

In some detail, JP-A-5-154910 (the term "JP-A" as used herein means an "unexamined published Japanese patent application") describes that the expansion of a bubble completes at the frost line. The diameter of a bubble at the frost line, which appears when the resin of the bubble reaches its crystallizing temperature, is virtually equal to that of a finally obtained blown film as shown in figures accompanying JP-B-62-6489 (the term "JP-B" as used herein means an "examined published Japanese patent application"), JP-B-2-46376, JP-B-2-46377, JP-B-63-47608, JP-B-1-47286, JP-B-63-51094, JP-B-2-47337, JP-A-56-93519, JP-B-3-40689, JP-A-62-21521, JP-A-62-149417, JP-A-62-284726, JP-B-1-54182, and JP-A-4-8529.

Accordingly, the expansion of a bubble is conducted only by blowing the bubble in the molten state until the bubble reaches the frost line. In other words, crystalline orientation by blowing, i.e., stretching the bubble at a temperature lower than the crystallizing temperature, is not carried out by blowing with air, so that it is not sufficient enough to impart film strength and satisfactory appearance which limits the use of the resulting film.

Where a blown film is subjected to crystalline orientation by means of an inside mandrel, since the film tends to be scratched due to friction with the mandrel, the resin material applicable to this method is limited.

It is possible to subject a flattened tube to crystalline orientation by varying the take-off speed of nip rolls as taught by JP-B-61-34372. However, crystalline orientation by this method is effective only in the take-off direction (machine direction).

In order to obtain a biaxially stretched film by blown-film extrusion, JP-B-62-46337 discloses a process comprising forwarding a flattened tube to a guide roll, blowing air into the tube while heating the tube with high temperature air blown from a hot air ring to expand the flattened tube into a cylinder, and cooling the expanded tube with cooling air blown from a cooling air ring provided on the downstream side of the hot air ring. This process not only requires expensive equipment to carry out but attains a low production speed.

OBJECTS OF THE INVENTION

Accordingly, an object of the present invention is to provide a process for producing an orientated blown film, in which crystalline orientation of a film is conducted by expansion of a bubble without using an inside mandrel.

SUMMARY OF THE INVENTION

The present invention relates to a process for producing an orientated blown film of a thermoplastic resin by blown film extrusion, comprising blowing air into an extruded bubble of the resin extruded from a ring die to expand the bubble and cooling the expanded bubble with air from an air cooling ring, wherein blown-film extrusion is carried out under such conditions that the ratio of (b) a final diameter of an expanded bubble to (a) a diameter of a bubble at the crystallizing temperature of the thermoplastic resin ((b)/(a)) ranges from 1.5 to 10.

A first embodiment of the present invention relates to a process comprising extruding a molten resin from an orifice of a ring die into a bubble, introducing air into the bubble to expand it, and cooling the expanded bubble by blowing air from an air cooling ring provided around the bubble, in which said cooling is carried out by using a cooling apparatus provided on the downstream side of the air cooling ring, comprising a plurality of rectifying cylinders having different diameters arrayed at certain intervals in the radial direction concentrically with the ring die to form a ring air chamber with its downstream end open between each two adjacent cylinders, wherein the outermost rectifying cylinder has a plurality of intake vents for intake of open air in a radial manner at a position closer to the air cooling ring than to the downstream end of the outermost rectifying cylinder, and the remaining rectifying cylinders each have a vent in the region of the bottom end (upstream end) thereof so that the air chambers are ventilated, with the height of the rectifying cylinders gradually increasing toward the outermost one so that the downstream ends of the cylinders may form a tapered guide for the bubble, and blown film extrusion is carried out in such a manner that the position of the diameter (a) of the bubble at the crystallizing temperature of the resin may be in the upper course (upstream) of the downstream end of the outermost rectifying cylinder.

In a preferred embodiment of the present invention, the molten bubble, while being cooled with air from the outside, is also cooled from the inside by means of an internal cooling double cylinder comprising two upright ducts arrayed concentrically with the axis of the ring die, each duct having a plurality of vents for blowing air on the cylinder wall so that air is fed into the inside of the inner duct and blown outside through the passageway formed between the inner and outer ducts.

The above-described embodiment using an internal cooling cylinder further includes an embodiment in which the extruded bubble is preliminarily cooled from the outside with a first air cooling ring provided directly below the ring die and then substantially cooled with a second air cooling ring provided below the first air cooling ring, said first and second air cooling rings being coupled via a cylindrical wall surrounding the bubble.

DETAILED DESCRIPTION OF THE INVENTION

In blown-film extrusion, a molten resin bubble extruded from a ring die is cooled to the crystallizing temperature of the resin with air fed from a cooling blower. According to the present invention, the thus cooled bubble is forced to undergo crystalline orientation with air at a temperature below the crystallization temperature to obtain the above-described (b)/(a) ratio of from 1.5 to 10 thereby providing a blown film excellent in strength, appearance, and heat shrinkage characteristics. This can be achieved by providing a plurality of rectifying cylinders on the downstream side of the air cooling ring concentrically with the ring die at certain intervals, with the height of the rectifying cylinders gradually increasing toward the outermost one to produce a Venturi effect. By the Venturi effect, the space between the bubble and the downstream opening of each air chamber formed by two adjacent rectifying cylinders has diminished pressure, and the bubble is thereby attracted to the tapered guide formed by the plurality of rectifying cylinders.

The air from the air cooling ring flows along the outer side of the bubble and increases in speed while passing between the bubble and the downstream ends of the rectifying cylinders. The inner pressure between the bubble and the downstream end of each rectifying cylinder is thus diminished by the Venturi effect thereby letting open air in the air chambers through intake vents of the outermost cylinder and vents of the other cylinders. As the air flow from the air cooling ring runs along the outer side of the bubble, part of the air in the air chambers joins the air flow and is made to flow downstream along the bubble to effectively cool the bubble. At the same time, the bubble can be stably supported from the outer peripheral side by the ring air chambers having diminished inner pressure. A blown film having a desired blow-up ratio can thus be produced.

In producing resin films having different blow-up ratios while fixing the take-off speed and the film thickness by means of the cooling apparatus equipped with the air cooling ring and the plurality of rectifying cylinders the downstream end of which form a cone-shaped tapered guide for the bubble, a resin bubble can be stably supported by the tapered conical guide irrespective of the blow-up ratio by increasing the number of vents of the rectifying cylinders with increase in blow-up ratio and, if necessary, also increasing the number of the air chambers with increase in blow-up ratio. As a result, it is possible to produce a blown film having a blow-up ratio as high as 5 to 26.

Figure 9:
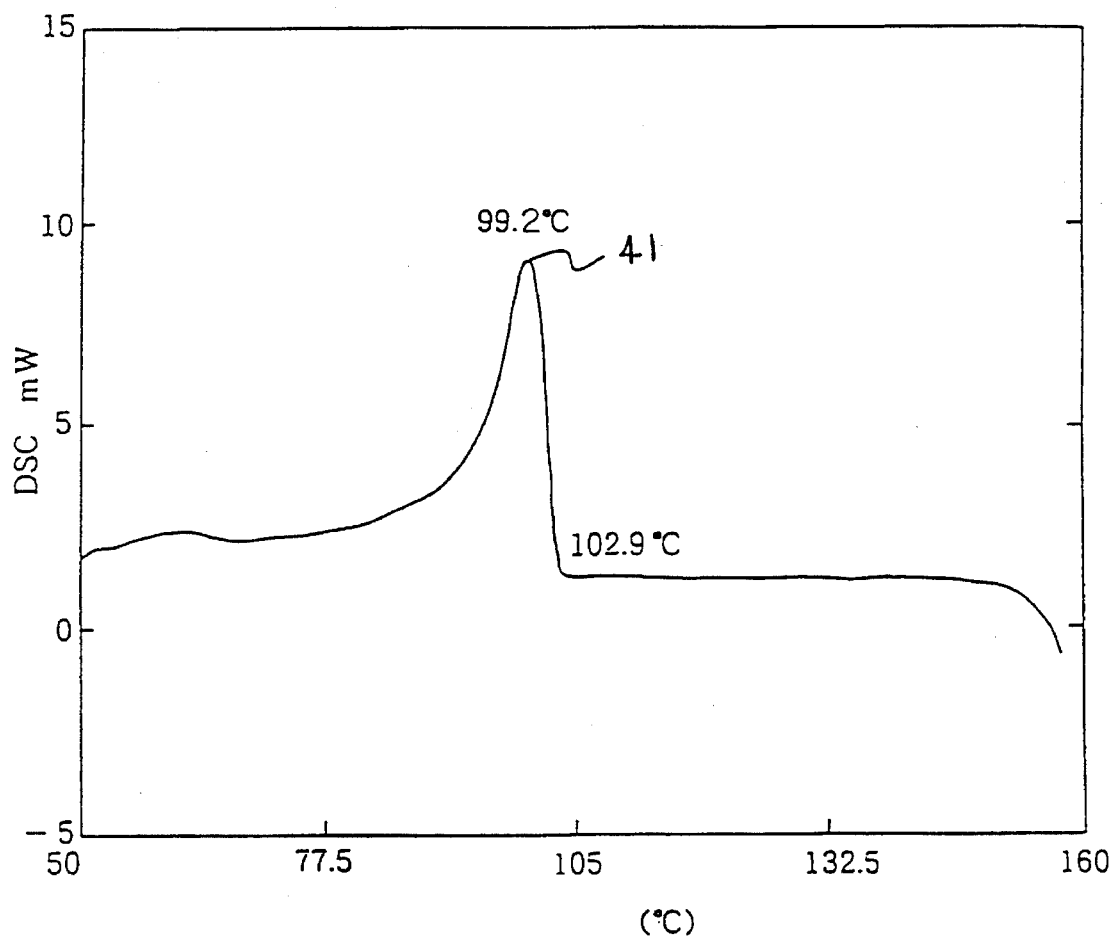
FIG. 9 is a graph showing a crystallizing temperature as measured with a differential scanning calorimeter (DSC).

The terminology "crystallizing temperature" as used in the present invention for a bubble is the peak temperature (41) of a DSC curve of a crystalline-thermoplastic resin as shown in FIG. 9 (sample: 5 mg; rate of temperature fall: 10° C./min). In cases where the curve has two or more peaks, the highest one is taken as a crystallizing temperature. This peak is generally regarded as a temperature at which a frost line appears, wherein a solid phase and a dissolved phase are mixed in the bubble. In preferred embodiments of the present invention, the speed of the air flow from the air cooling ring is controlled so that the position where the frost line appears, i.e., the position of the diameter (a), may be in the upper course of the downstream end of the outermost rectifying cylinder. That position is preferably within the range of 1/5 to 4/5 the height (H) of the outermost rectifying cylinder from the downstream end thereof.

In the lower course of the frost line, in which the pressure between the bubble and each rectifying cylinder is diminished by the Venturi effect, the bubble is attracted to the side of the rectifying cylinders and subject to crystalline orientation to provide a blown film having excellent strength, appearance and heat shrinkage characteristics.

In the above-mentioned preferred embodiment using an internal double cooling cylinder, the position where the bubble reaches its crystallizing temperature (the position where the frost line appears) is also set in the upper course of the downstream end of the outermost rectifying cylinder, and the bubble in the lower course of that position is subject to crystalline orientation by suction to the side of the rectifying cylinders by the action of the Venturi effect.

The thermoplastic resins which can be used in the present invention include olefin-based resins, such as an ethylene-vinyl acetate copolymer having a vinyl acetate content of from 5 to 25% by weight and a melt flow rate (MFR) of from 0.3 to 10 g/10 min, a linear low-density ethylene-based copolymer comprising from 75 to 99% by weight of ethylene and from 1 to 25% by weight of an α-olefin having from 3 to 8 carbon atoms, high-density polyethylene, low-density polyethylene, an ethylene-acrylic acid copolymer, an ethylene-methyl acrylate copolymer, an ethylene-methyl methacrylate copolymer, a propylene homopolymer, a copolymer comprising 60 to 99.5% by weight of propylene and from 0.5 to 40% by weight of ethylene or an α-olefin having from 4 to 8 carbon atoms; poly(4-methyl-1-pentene), and polybutene; and other crystalline thermoplastic resins, such as polyamide resins, polyethylene terephthalate, and polybutylene terephthalate. Polycarbonate resins may also be used.

Examples of the α-olefin as noted above are propylene, 1-butene, 1-heptene, 1-hexene, 4-methyl-1-pentene, and 1-octene.

These thermoplastic resins may be used either individually or in combination of two or more thereof.

If desired, the thermoplastic resin may contain an impact modifier in an amount which does not impair the transparency of the film, preferably 0.5 to 20% by weight. Suitable impact modifiers include a hydrogenated petroleum resin, a hydrogenated styrene-butadiene-styrene copolymer, an ethylene-propylene copolymer, an ethylene-1-butene copolymer, 1,2-polybutadiene, and an ethylene-propylene-ethylidenenorbornene copolymer.

The thermoplastic resin may further contain a lubricant for improving slip properties, a tackifier, a nucleating agent for improving transparency, an antioxidant, a flame retardant, an ultraviolet absorbent, or any combination of these agents in a total amount of from 0.1 to 2% by weight.

Suitable lubricants include aliphatic alcohol fatty acid esters obtained from an aliphatic alcohol having 1 to 12 carbon atoms, and preferably 1 to 6 carbon atoms, and a fatty acid having 10 to 22 carbon atoms, and preferably 12 to 18 carbon atoms, such as glycerol monooleate, glycerol di- or trioleate, glycerol triricinoleate, glycerol acetylricinoleate, methyl acetylricinoleate, ethyl acetylricinoleate, butyl acetylricinoleate, propylene glycol oleate, propylene glycol laurate, pentaerythritol oleate, polyethylene glycol oleate, polypropylene glycol oleate, polyoxyethylene glycerol, polyoxypropylene glycerol, sorbitan oleate, sorbitan laurate, polyethylene glycol sorbitan oleate, and polyethylene glycol sorbitan laurate; polyalkylene ether polyols, such as polyethylene glycol and polypropylene glycol; sugar fatty acid esters, epoxidized soybean oil, polyoxyethylene alkylamine fatty acid esters, polyoxyethylene alkylphenyl ethers; higher fatty acid amides having 12 to 22 carbon atoms, such as oleamide, stearamide, and erucamide; ethylene-bis-stearamide, ethylene-bisoleamide, polyethylene wax, polypropylene wax, and liquid paraffin. Suitable nucleating agents include inorganic substances, such as talc and silica. Suitable tackifiers include castor oil derivatives, low-molecular viscous polybutylene, sorbitan higher fatty acid esters, terpene resins, and petroleum resin.

The resin film may have a single layer structure or a laminate structure according to the end use. For example, a heat sealing resin layer may be laminated on one or both sides of a base film. In this case, the melting point of the resin on the heat sealable side and that of the resin at least on the other side preferably has a difference of more than 10° C. so as to have a broad range of heat sealing temperature.

A multi-layer laminate structure is preferred to a single layered structure from the standpoint of stability in molding. The layer structure of the multi-layer film includes the following embodiments (1) to (12):

1) A laminate film composed of a base layer comprising a low-density polyethylene-based resin having laminated on one or both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

2) A laminate film composed of a base layer comprising a high-density polyethylene-based resin having laminated on one or both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

3) A laminate film composed of a base layer comprising a linear low-density polyethylene-based resin having laminated on one or both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

4) A laminate film composed of a base layer comprising a propylene-based resin having laminated on one or both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

5) A laminate film composed of a base layer comprising a resin selected from polycarbonate, polyamide, polyethylene terephthalate, and polybutylene terephthalate having laminated on one or both sides thereof a surface layer comprising a resin selected from a copolymer comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester, low-density polyethylene, high-density polyethylene, linear low-density polyethylene, and a propylene-based resin.

6) A laminate film composed of a base layer comprising from 10 to 90% by weight of a crystalline polyolefin-based resin selected from an ethylene-based resin and a propylene-based resin and from 10 to 90% by weight of an olefinic thermoplastic elastomer having laminated on both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

7) A laminate film composed of a base layer comprising from 80 to 95% by weight of linear low-density polyethylene and from 5 to 20% by weight of a copolymer comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester having laminated on both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

8) A laminate film composed of a base layer comprising from 10 to 90% by weight of a 1-butene-based resin and from 10 to 90% by weight of an olefin-based resin (exclusive of a 1-butene-based resin) and/or an olefinic thermoplastic elastomer having laminated on both sides thereof a surface layer comprising a copolymer resin comprising from 60 to 95% by weight of ethylene and from 5 to 40% by weight of a monomer selected from vinyl acetate, an aliphatic unsaturated carboxylic acid, and an aliphatic unsaturated monocarboxylic acid alkyl ester.

9) A laminate film composed of a low-density polyethylene-based resin layer having laminated on one or both sides thereof a linear low-density polyethylene-based resin layer.

10) A laminate film composed of a high-density polyethylene-based resin layer having laminated on one or both sides thereof a low-density polyethylene layer or a linear low-density polyethylene-based resin layer.

11) A laminate film composed of a linear low-density polyethylene-based resin layer having laminated on one or both sides thereof a low-density polyethylene layer or a propylene-based resin layer.

12) A laminate film composed of a propylene-based resin layer having laminated on one or both sides thereof a linear low-density polyethylene-based resin layer.

Where two or more different kinds of the above-mentioned crystalline thermoplastic resins are used in separate layers or as a mixture thereof, the temperature at the maximum highest peak in the DSC curve of the laminate film or mixed resin film is taken as the crystallizing temperature.

Figure 1:
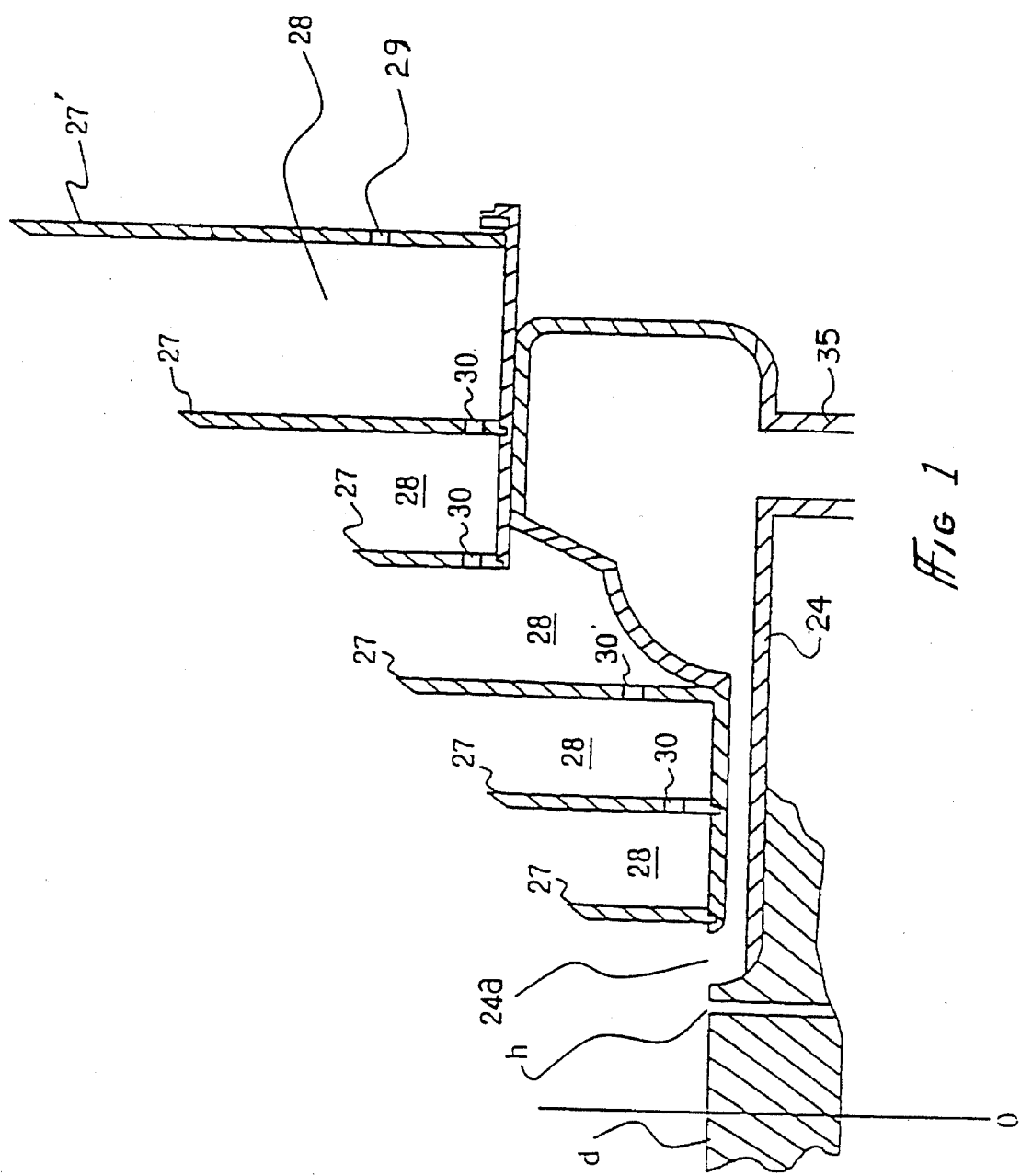
FIG. 1 is a cross-sectional view of a cooling apparatus used in blown-film extrusion according to the present invention.

The cooling apparatus which can be used in carrying out the blown-film extrusion according to the present invention comprises air cooling ring 24 which is provided close to the orifice $\underline{h}$ of ring die $\underline{d}$ and air chamber 28 as shown in FIG. 1.

Figure 2:
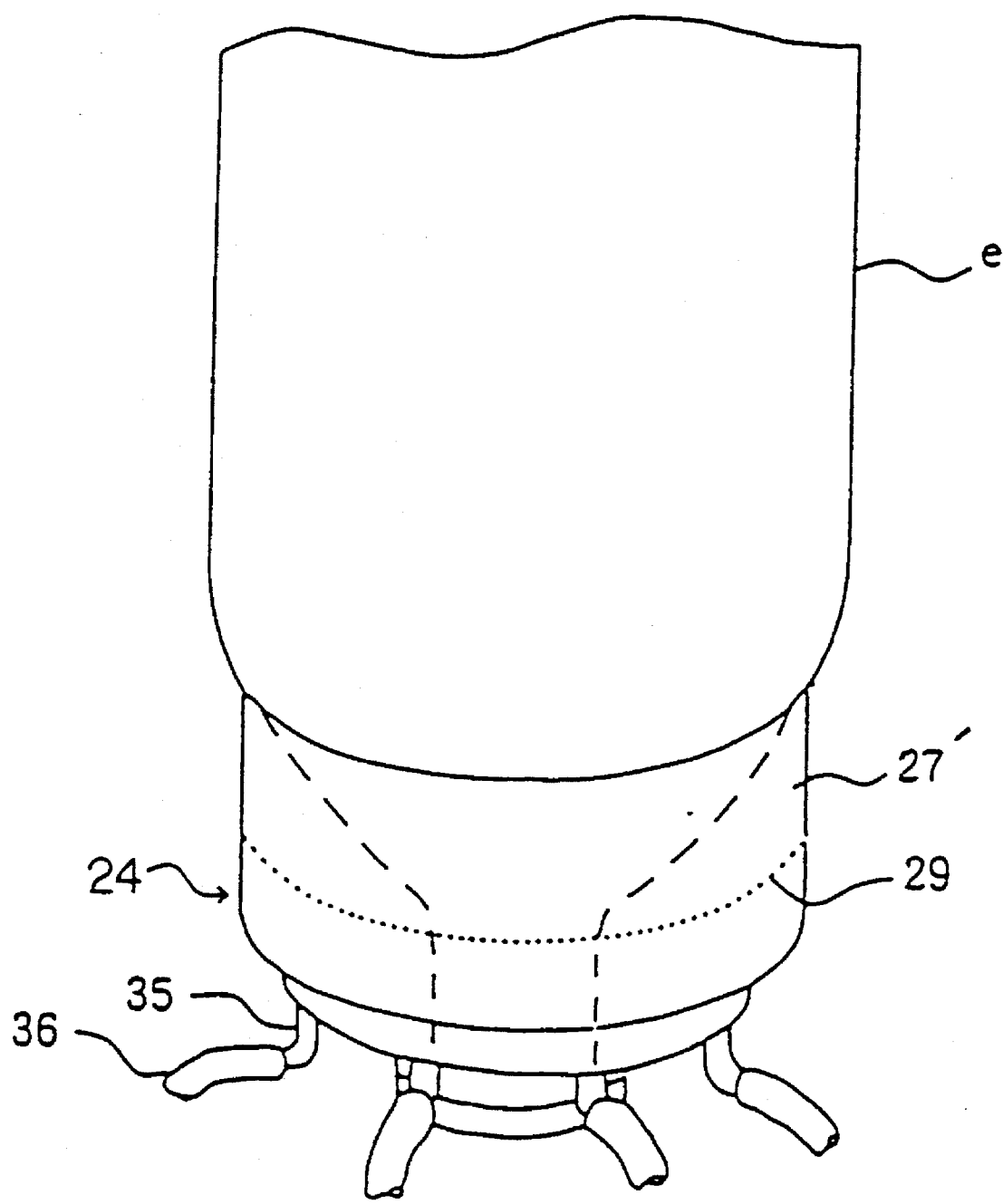
FIG. 2 is a side view of the cooling apparatus of FIG. 1.

The air cooling ring 24 has air introducing ducts 35 and hoses 36, as shown in FIG. 2. Cooling air from a cooling blower 14 (shown in FIG. 7) enters the air cooling ring 24 via the hoses 36.

Figure 3:
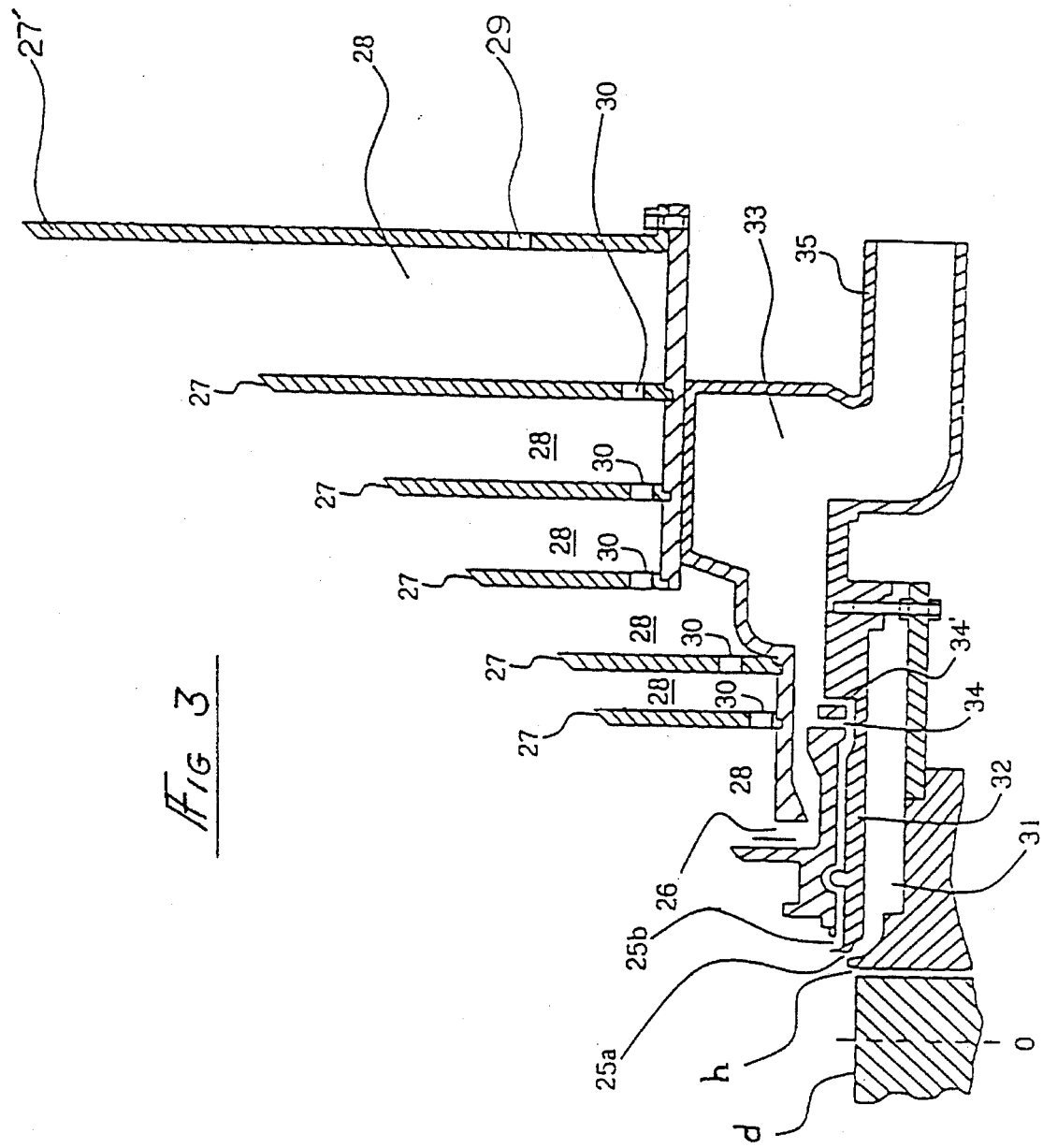
FIG. 3 is a cross-sectional view of another cooling apparatus used in blown-film extrusion according to the present invention.

In order to further improve the appearance of the film, one or more auxiliary air nozzles 25a, 25b may be provided in addition to main air nozzle 26 as shown in FIG. 3. The flow rate of air from these auxiliary air nozzles may be controlled. Passage 31 is the first passage, and passage 33 is the second passage for air introduced from the air introducing ducts 35, both the passages being separated with a partition member 32, as shown in FIG. 3. Main air nozzle 26 and the second auxiliary air nozzle 25b are communicated via communication passages 34, 34'.

Figure 4:
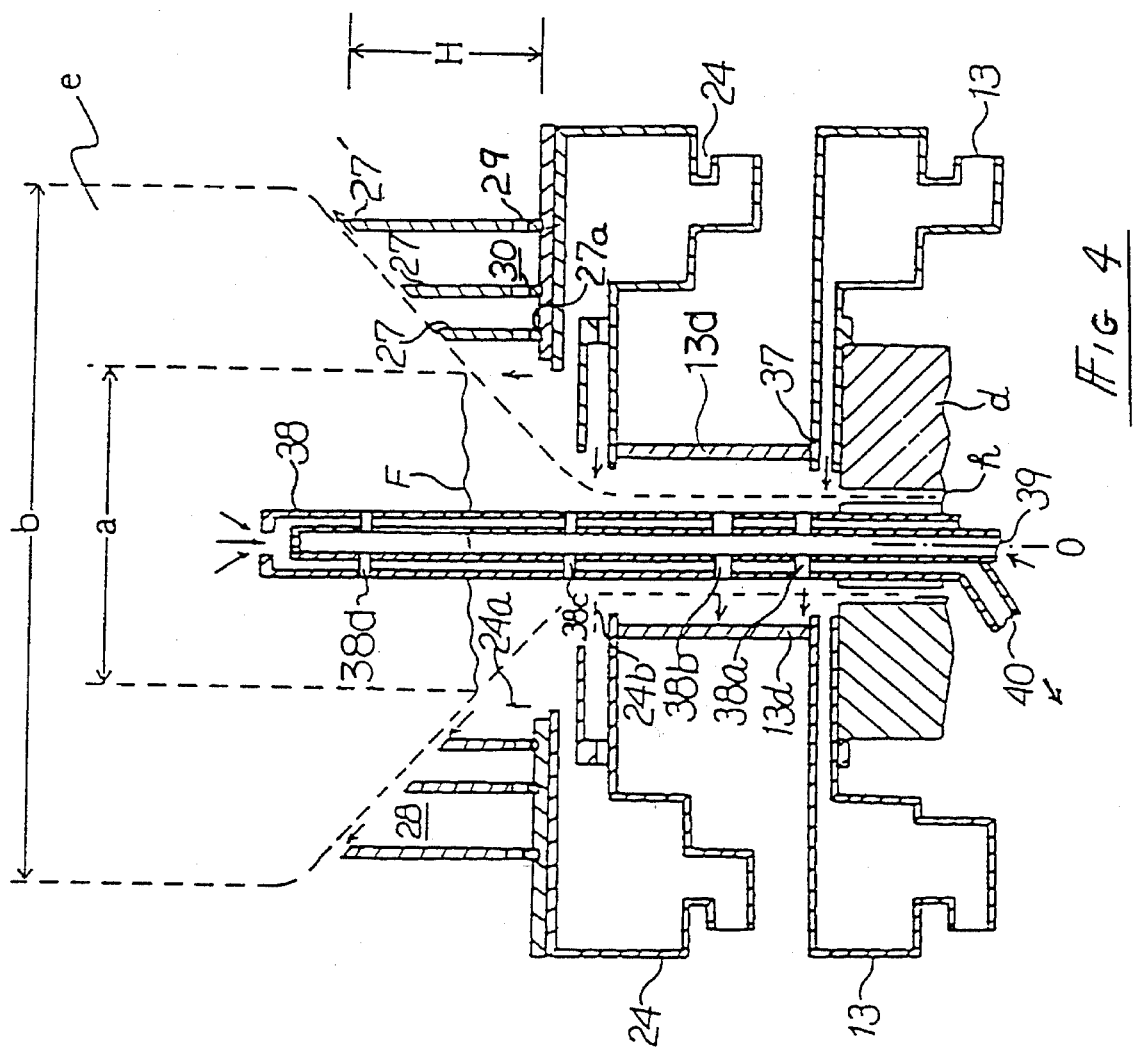
FIG. 4 is a cross-sectional view of still another cooling apparatus used in blown-film extrusion according to the present invention. The bubble diameter (a) at the end point of crystallization is shown in this Figure.

Additionally, internal cooling cylinder 38 may be used in combination for cooling the bubble from the inside as shown in FIG. 4. Internal cooling cylinder 38 is an upright cylinder provided concentrically with the axis $\underline{o}$ of ring die $\underline{d}$, and a plurality of vents 38a, 38b, 38c, and 38d are provided on the cylinder wall.

Figure 5:
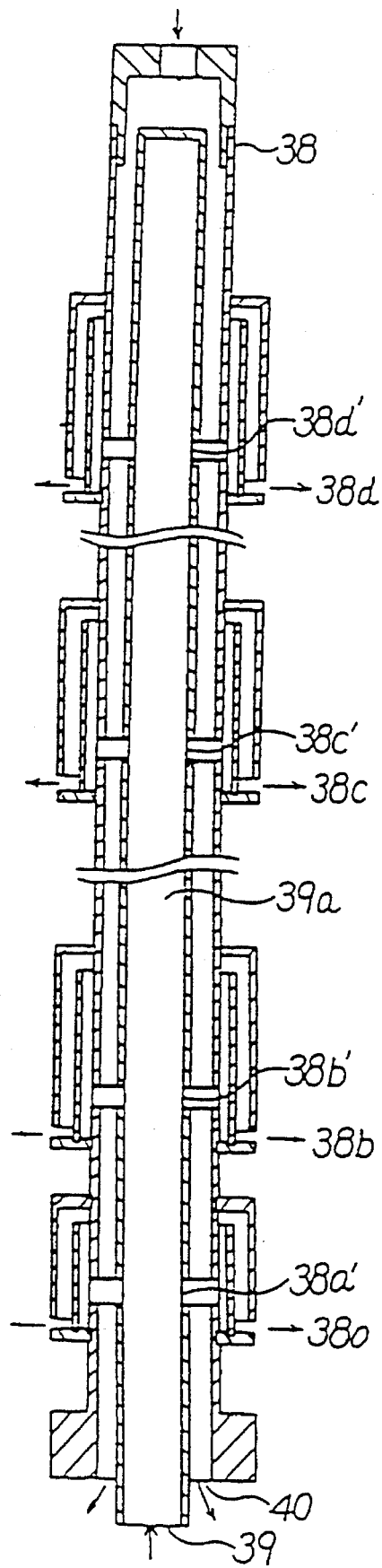
FIG. 5 is a cross-sectional view of an internal cooling cylinder.

Internal cooling cylinder 38 has a double structure composed of inner and outer ducts as shown in FIGS. 4 and 5. Cooling air from pump 12 enters chamber 39a of the inner cylinder via intake vent 39 and goes out through a plurality of vents 38a, 38a', 38b, 38b' . . . 38d, and 38d' provided on the inner and outer ducts at 40 to 200 mm intervals to cool the bubble from the inside thereof. The degree of cooling from the inside by means of the internal cooling cylinder is made to agree with that from the outside by means of air cooling rings 13 and 24 so as to conduct cooling uniformly. The second air cooling ring 24 is mounted on the plate 37 of the first air cooling ring 13 by the support 13d. The second air cooling ring 24 has air nozzles 24a, 24b. The air from internal cooling cylinder 38 serves not only to cool the bubble from the inside but to expand the bubble. The central portion of the top surface of the outer duct is open. The chamber formed between the inner and outer ducts serves as a passageway for ventilation, and air is driven out of the bubble from venting hole 40.

Figure 6:
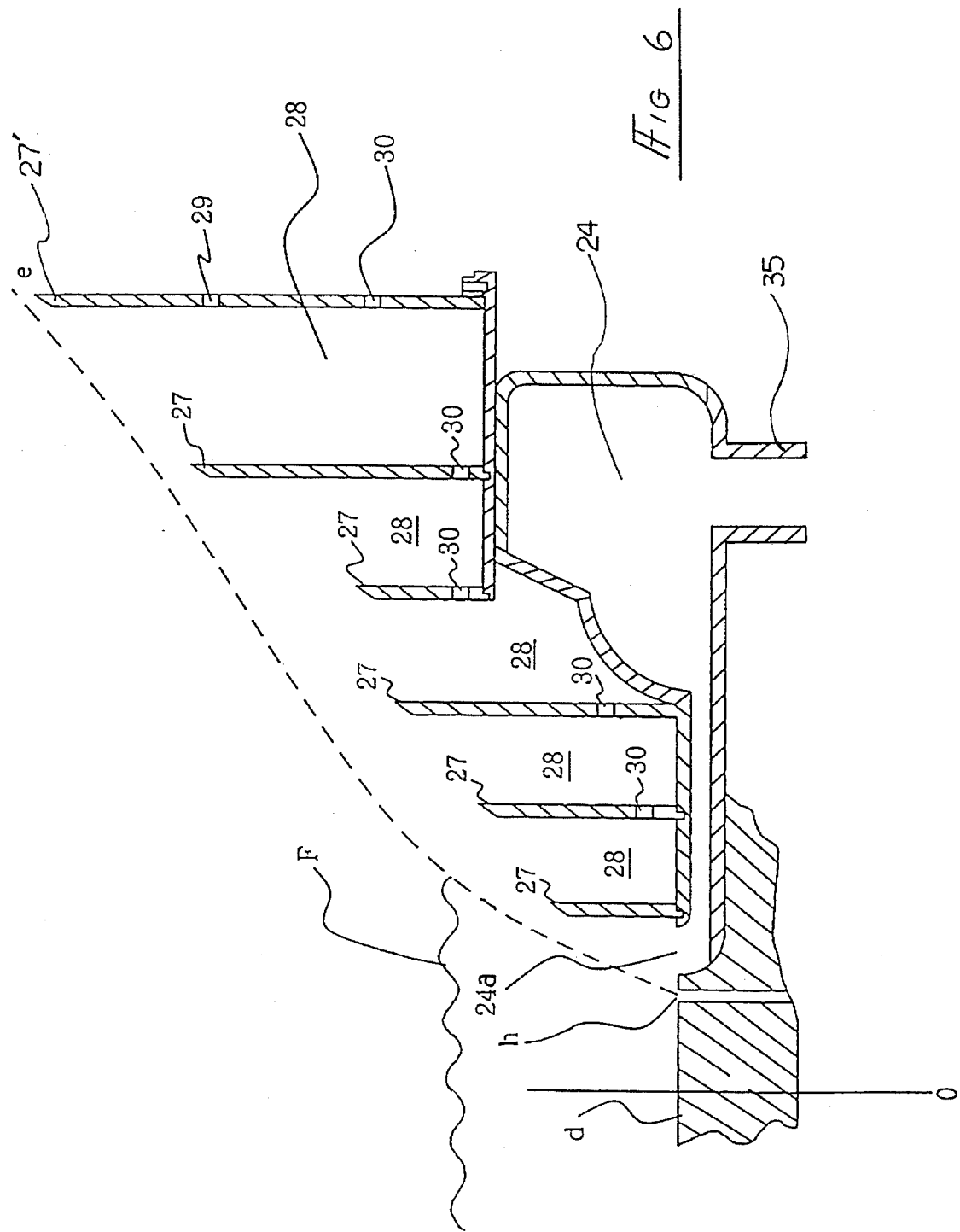
FIG. 6 shows the frost line F of the bubble at the end point of crystallization.

On the downstream side of second air cooling ring 24 in FIG. 6 are provided a plurality of rectifying cylinders 27 having different diameters at certain intervals in the radial direction concentrically with the axis of orifice $\underline{h}$ to form air chamber 28 with its downstream end open between each two adjacent cylinders. The outermost rectifying cylinder 27' has a plurality of intake vents 29 for intake of open air at the radial positions closer to second air cooling ring 24 than to the downstream end. All the rest of the rectifying cylinders each have a vent 30 at the bottom end (upstream end) thereof so that the plurality of air chambers are ventilated. The height of the rectifying cylinders gradually increases toward the outermost one so that the downstream ends of the plurality of cylinders may form a cone-shaped tapered guide for the bubble. The generatrix of the tapered guide preferably makes an angle of from 45° to 70° with the axis $\underline{o}$ of the orifice $\underline{h}$.

The generatrix of the tapered guide does not need to be a straight line and may be a quadratic curve according to the end use of the film.

Outermost rectifying cylinder 27', whose diameter is the greatest of all the rectifying cylinders, has a plurality of intake vents 29 at radial positions closer to air cooling ring 13, 24 than to the downstream end thereof. Outermost rectifying cylinder 27' is fixed to the upper side of air cooling ring 13, 24 with screws.

Other rectifying cylinders 27 each have a tenon at the bottom 27a, and the face of air cooling ring 13, 24 has a ring mortise for that tenon so that each rectifying cylinder 27 may be removably fitted to the face of the air cooling ring 24. A part of bottom 27a of rectifying cylinder 27 is cut to radially make venting holes 30 so as to ventilate neighboring air chambers 28

At least two rectifying cylinders 27 having the same diameter and different heights should be prepared for choice of a blow-up ratio. When a cylinder of smaller height is chosen for a given diameter, the plurality of rectifying cylinders as a whole must have an increasing height toward the outermost cylinder 27'.

When the above-mentioned cooling apparatus equipped with a single- or multi-stage cooling ring and a plurality rectifying cylinders is employed for the production of a blown film, as a blow-up ratio increases with the film thickness and the take-off speed being fixed, the number of the air cooling rings is increased to increase the number of the auxiliary air nozzles and, if desired, the number of the air chambers supporting the bubble is also increased. The bubble can be supported in a stable manner irrespective of the blow-up ratio by this manipulation.

The air from the air nozzle(s) of the air cooling ring(s) is blown against the molten bubble and thereby has its temperature slightly raised. The air is then made to flow downstream between the bubble and the tapered conical section formed by the downstream ends of the rectifying cylinders to produce Venturi effect, by which the inner pressure between the bubble and the cone is diminished and the bubble is attracted to the side of the rectifying cylinders by suction. Since open air can be taken into the ring air chambers through the intake vent of the outermost rectifying cylinder and the vents of other cylinders, part of the air of the air chambers joins the air flow from the air cooling ring and is made to flow downstream along the bubble to rapidly cool the bubble. At the same time, the bubble extruded from the ring die can be stably supported from the outer peripheral side and also attracted downward by the ring air chambers having diminished inner pressure. As a result, tension is provided between the bubble and the take-off, thus making it feasible to orientate the blown film.

Additionally, since the height of the rectifying cylinders increases toward the outermost one to form a tapered conical section widening downstream, the extruded bubble can be rapidly inflated even to a high blow-up ratio without contacting with the downstream end of each rectifying cylinder immediately after extrusion.

Further, open air taken in through intake vents is made to flow through each air chamber via the respective vent in proportion to the degree of pressure decrease. Therefore, the pressure in each air chamber is constantly maintained at a pressure suited for bubble inflation.

It is preferable to control the rate of air flow from the air cooling ring in such a manner that the bubble may have diameter (a) at the crystallizing temperature at a position 5 to 60 cm, and preferably 15 to 55 cm, upstream from the downstream end of outermost rectifying cylinder 27'. This can be achieved by adjusting the flow rate of the air from the air cooling ring within a range of from 0.01 to 50 m$^3$/min, and preferably from 5 to 45 m$^3$/min. Where a multi-stage air cooling ring as shown in FIG. 4 is used, the flow rate of the air from the first air cooling ring is adjusted to 5 to 50 m$^3$/min, and that from the second air cooling ring 5 to 50 m$^3$/min, respectively. The latter air flow rate is preferably set higher than that of the former. For example, the former preferably ranges from 0.01 to 40 m$^3$/min, while the latter preferably ranges from 5 to 50 m$^3$/min. Further, the total air flow rate from the internal cooling cylinder is preferably from 0.01 to 3 m$^3$/min, more preferably from 0.01 to 1 m$^3$/min.

The ratio of final diameter (b) of an expanded bubble to diameter (a) of a bubble at the crystallizing temperature ((b)/(a)) ranges from 1.5 to 10, and preferably from 2 to 8. If the (b)/(a) ratio is less than 1.5, the crystalline orientation by forced stretching is insufficient, and provides a film having inferior physical properties, such as strength and heat shrinkage characteristics. If the (b)/(a) ratio exceeds 10, the amount of air from the air cooling ring necessary for obtaining such a high (b)/(a) ratio is so large that the stability of the bubble would be reduced.

Thus, the bubble is cooled to the crystallizing temperature at a position before the bubble goes to the downstream end of the outermost rectifying cylinder by controlling the amount of air from the air cooling ring, and in the lower course of that position the bubble is attracted to the side of the rectifying cylinders by the diminished pressure of the air chambers. As a result, the bubble is subjected to crystalline orientation to provide an orientated blown film.

The present invention will now be illustrated in greater detail with reference to Examples, but the present invention should not be construed as being limited thereto. All the percentages are given by weight unless otherwise indicated.

EXAMPLE 1

Figure 7:
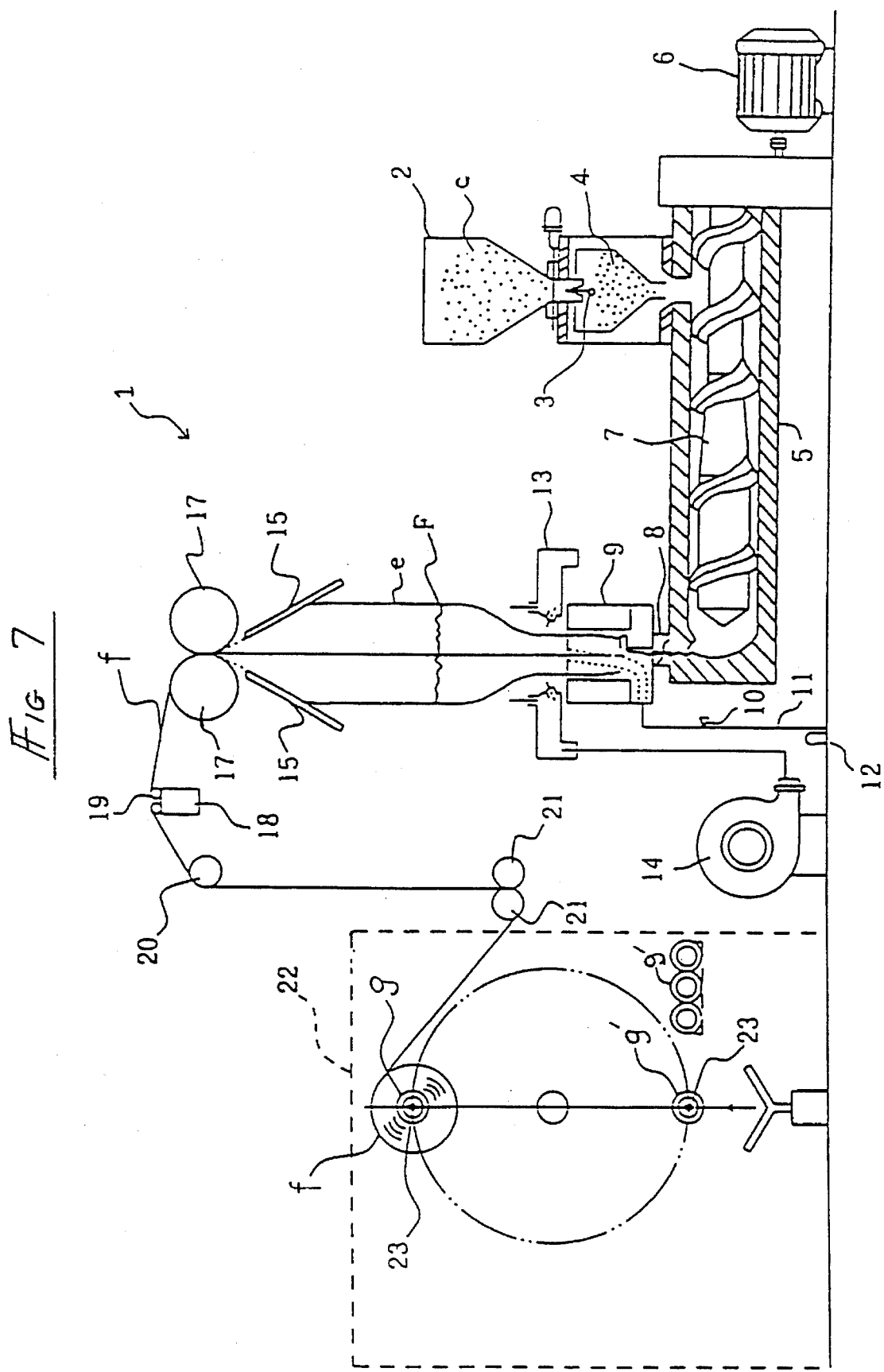
FIG. 7 is a cross-sectional view of a conventional blown-film extrusion machine.

Blown-film extrusion was conducted using a blown-film extrusion machine shown in FIG. 7 with its cooling ring 13 being displaced with cooling apparatus 13' shown in FIG. 2 and FIG. 3. The ring die and the cooling apparatus had the following specifications.

Diameter of ring die $\underline{d}$: 50 mm

Lip width: 1.0 mm

Air nozzle 26 of air cooling ring:
  Height: on the same level as the face of die head $\underline{d}$
  Air flow rate: 12 m$^3$/min
  Air flow speed: 45 m/sec Angle of slope of rectifying cylinders: 60°

Air cooling conditions: see Table 1.

TABLE 1

|  | Diameter (mm) | Height* (mm) | Blow-up Ratio | Bubble Surface Temp. (°C.) |
| --- | --- | --- | --- | --- |
| Die Orifice | 50 | 0 | 1 | 169 |
| Innermost | 165 | 40 | 2.7 | 108 |
| Second | 245 | 75 | 4.3 | 74 |
| Third | 325 | 110 | 5.9 | 57 |
| Fourth | 410 | 145 | 7.6 | 53 |
| Fifth | 495 | 180 | 9.3 | 43 |
| Outermost | 580 | 215 | 11 | 41 |

Note: The height is measured from the face of die head d.

Linear low-density polyethylene (density: 0.923 g/cm$^3$; MFR at 190° C.: 0.3 g/10 min; crystallinity: 50%; crystallizing temperature: 99.2° C., the DSC chart is shown in FIG. 9) was kneaded in an extruder (diameter: 50 mm; L/D: 25) at 190° C., fed to a ring die, extruded at a die temperature of 190° C., inflated at a blow-up ratio of 12.0 to a final bubble diameter (b) of 600 mm, and taken off at a take-off speed of 6 m/min to obtain a blown film having a thickness of 35 μm.

The bubble diameter (a) an the crystallizing temperature (150 mm) was positioned at the point where the blow-up ratio reaches about 3 as shown in FIG. 6. Downstream of this point, the pressure between the bubble and each rectifying cylinder was kept diminished by Venturi effect to conduct forced orientation ((b)/(a)=4).

Figure 8:
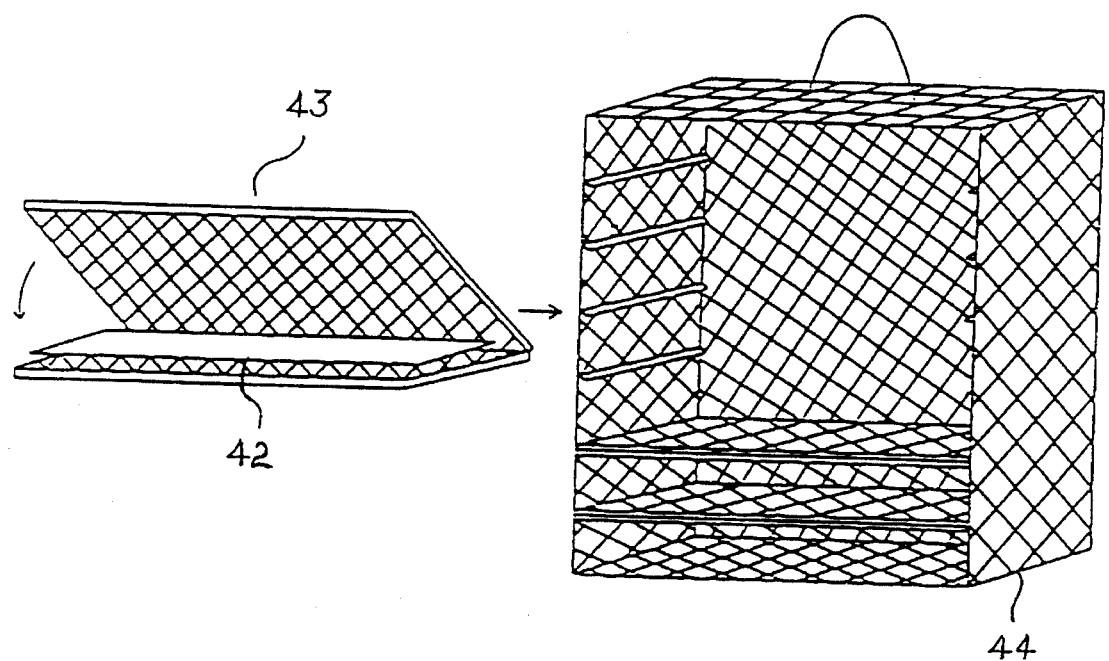
FIG. 8 is a device for measuring heat shrinkage characteristics of a resin film.

Physical properties of the resulting film were measured according to the following test methods. The results obtained are shown in Table 8 below. In the table, tensile strength at break and tensile elongation at break were measured according to JIS Z-1702; haze was measured according to JIS K-6714; and gloss was measured according to JIS Z-8741 (20°). The heat shrinkage characteristics were measured as follows: a film (42) cut to a size of 100 mm in the machine direction (MD) and 100 mm in the transverse direction (TD) was set in the device (43, 44) shown in FIG. 8 and immersed in a heating medium (standard: silicone oil (100 c/s)) at a prescribed temperature for 3 minutes. After taking out of the heating medium, the percent shrinkage in each direction was calculated from the following equation:

Percent Shrinkage (%)=$(l_o-l)/l_o \times 100$ wherein $l_o$ is the original length (100 mm); and l is the length (mm) after immersion.

COMPARATIVE EXAMPLE 1

An attempt was made to obtain a blown film at a blow-up ratio of 12 in the same manner as in Example 1, except for removing the plurality of rectifying cylinders, but the attempt failed due to instability of the bubble.

COMPARATIVE EXAMPLE 2

A blown film was produced in the same manner as in Example 1, except for changing the amount of air to be fed into the inside of the bubble so as to obtain a blow-up ratio of 3. Physical properties of the resulting film were evaluated in the same manner as in Example 1, and the results obtained are shown in Table 8.

EXAMPLE 2

A three-layered blown film was produced by using the same cooling apparatus as used in Example 1 under the following conditions.

An ethylene-4-methyl-1-pentene copolymer (density: 0.910 g/cm$^3$; MFR at 190° C.: 3.6 g/10 min; crystallinity: 36%; crystallizing temperature in DSC measurement: 100.1° C.) (resin A), was kneaded in an extruder (diameter; 65 mm; L/D: 25) at 175° C. Separately, a resin composition consisting of 97.1% of an ethylene-vinyl acetate copolymer (vinyl acetate content: 15%; MFR at 190° C.: 2.0 g/10 min; crystallinity: 47% ; crystallizing temperature in DSC measurement: 75.7° C.), and 2.9% of glycerol dioleate "Rikemal O-71-D" (a product of Riken Vitamin Oil Co., Ltd. ) (resin B) was kneaded in an extruder (diameter: 50 mm; L/D: 25) at 160° C.

Two molten resins A and B were fed to a three layered ring die with resin A as an intermediate layer and resin B as a surface layer on each side of the intermediate layer, co-extruded at a die temperature of 175° C., inflated at a blow-up ratio of 12.0 to a final bubble diameter (b) of 600 mm, and taken off at a take-off speed of 20 m/min to obtain a resin film having a total thickness of 11 µm (B/A/B 3 µm/5 µm/3 µm).

The air nozzle of the air cooling ring was on the same level as the face of the die head $\underline{d}$. The air flow rate and the air flow speed of the air cooling ring were 13 m$^3$/min and 50 m/sec, respectively. The bubble diameter (a) at the crystallizing temperature was positioned at the point of blow-up ratio of about 3 in the same manner as in Example 1.

Physical properties of the resulting blown film ((b)/(a)=4) are shown in Table 8.

EXAMPLE 3

A three-layered blown film having the same composition and structure as in Example 2 was obtained using a cooling apparatus equipped with a multi-stage air cooling ring and an internal cooling cylinder as shown in FIG. 4 under the following conditions.

Diameter of ring die $\underline{d}$: 120 mm
Lip width: 1.5 mm
Die temperature: 175° C.
Blow-up ratio: 6.5
Final bubble diameter (b): 780 mm
Take-off speed: 50 m/min
Total thickness of film: 11 µm (B/A/B=4 µm/3 µm/4 µm)
Air cooling conditions: see Table 2 below.

TABLE 2

| | Height* (mm) | Air Flow Rate (m$^3$/min) | Air Flow Speed (m/sec) |
| --- | --- | --- | --- |
| First air cooling ring | 0 | 31 | 21 |
| Second Air Cooling Ring: | | | |
| Auxiliary Air Nozzle | 230 | 3.5 | 18 |
| Main Air Nozzle | 250 | 35 | 23 |

Note:
*Height measured from the face of die head $\underline{d}$.

Cylinder coupling for two air cooling rings:
  Outer diameter: 380 mm
  Height: 210 mm
Angle of slope of rectifying cylinders: 60°
Air cooling conditions: see Table 3 below.

TABLE 3

| | Diameter (mm) | Height* (mm) |
| --- | --- | --- |
| Innermost | 495 | 410 |
| Middle | 580 | 435 |
| Outermost | 700 | 600 |

Note:
*The height from the upper surface of die head $\underline{d}$.

Internal cooling cylinder:
  Outer duct diameter: 90 mm
  Inner duct diameter: 60 mm
  Air flow from nozzles: see Table 4 below.

TABLE 4

| Nozzle | Height* (mm) | Air Flow Rate (m$^3$/min) | Air Flow Speed (m/sec) |
| --- | --- | --- | --- |
| Lowest | 40 | 0.3 | 8 |
| 2nd | 100 | 0.3 | 8 |
| 3rd | 250 | 0.3 | 8 |
| Highest | 500 | 0.3 | 8 |

Note:
*Height from the upper surface of die head $\underline{d}$.

The bubble diameter (a) at the crystallizing temperature ((a)=300 mm) was positioned at the point of blow-up ratio of about 2.5.

Physical properties of the resulting film ((b)/(a)=2.6) were evaluated in the same manner as in Example 1, and the results obtained are shown in Table 8.

EXAMPLE 4

A three-layered blown film having the same composition and structure as in Example 2 was obtained using a cooling apparatus shown in FIG. 3 under the conditions shown in Table 5. The bubble diameter (a) at the crystallizing temperature ((a)=150 mm) was positioned at the point of blow-up ratio of about 3.

TABLE 5

| Air Nozzle | Height* (mm) | Air Flow Rate (m$^3$/min) | Air Flow Speed (m/sec) |
| --- | --- | --- | --- |
| Upstream (25a) | 0 | 0.004 | 0.015 |
| Midstream (25b) | 12 | 0.8 | 1.3 |

TABLE 5-continued

| Air Nozzle | Height* (mm) | Air Flow Rate (m³/min) | Air Flow Speed (m/sec) |
|---|---|---|---|
| Downstream (26) | 55 | 13 | 13 |

Note:
*Height from the face of die head d.

Physical properties of the resulting film ((b)/(a)=4) were evaluated in the same manner as in Example 1, and the results obtained are shown in Table 8.

COMPARATIVE EXAMPLE 3

A blown film was produced in the same manner as in Example 4, except for decreasing the air flow rates of the air cooling ring as shown in Table 6 below and changing the height of the rectifying cylinders as shown in Table 7 below so that the bubble diameter (a) at the crystallizing temperature ((a)=550 mm) might appear at the downstream end of the outermost rectifying cylinder (final bubble diameter: 600 mm; (b)/(a)=about 1.05).

TABLE 6

| Air Nozzle | Height* (mm) | Air Flow Rate (m³/min) | Air Flow Speed (m/sec) |
|---|---|---|---|
| Upstream (25a) | 0 | 0.002 | 0.008 |
| Midstream (25b) | 12 | 0.4 | 0.7 |
| Downstream (26) | 55 | 8 | 8 |

Note:
*Height from the face of die head d.

TABLE 7

| | Height* (mm) | Blow-up Ratio | Bubble Surface Temp. |
|---|---|---|---|
| Die Orifice | 0 | 1 | 170 |
| Innermost | 85 | 1.9 | 155 |
| Second | 180 | 4 | 140 |
| Third | 210 | 4.5 | 137 |
| Fourth | 270 | 5.9 | 128 |
| Fifth | 340 | 7 | 121 |

TABLE 7-continued

| | Height* (mm) | Blow-up Ratio | Bubble Surface Temp. |
|---|---|---|---|
| Sixth | 420 | 8.6 | 112 |
| Outermost | 590 | 10.8 | 101 |

Note:
*The height is measured from the face of die head d.

Physical properties of the resulting film were evaluated in the same manner as in Example 1, and the results obtained are shown in Table 8.

TABLE 8

| | Example 1 | Example 2 | Example 3 | Example 4 | Compar. Example 1 | Compar. Example 2 | Compar. Example 3 |
|---|---|---|---|---|---|---|---|
| Blow-up Ratio | 12 | 12 | 6.5 | 12 | 12 | 3 | 12 |
| Physical Properties | | | | | | | |
| Haze (%) | 12 | 1.7 | 0.9 | 1.1 | —* | 18 | 2.1 |
| Gloss (%) | 26 | 99 | 110 | 103 | — | 19 | 92 |
| Tensile Strength at Break (MD/TD)(kg/cm²) | 310/390 | 390/460 | 490/470 | 400/450 | — | 250/260 | 310/360 |
| Tensile Elongation at Break (MD/TD) (%) | 260/170 | 370/310 | 150/290 | 390/300 | — | 120/450 | 470/330 |
| Percent Shrinkage (MD/TD) (%): | | | | | | | |
| 80° C. | 0/2 | 7/4 | 10/7 | 8/5 | — | 0/0 | 3/2 |
| 100° C. | 2/10 | 18/7 | 22/9 | 17/7 | — | 2/0 | 10/4 |
| 120° C. | 58/73 | 45/36 | 54/49 | 42/38 | — | 43/32 | 31/29 |

Note:
*Unmeasurable due to failure of blown film production

As described and demonstrated above, the present invention provides a blown film excellent in strength, appearance and heat shrinkage characteristics.

The present invention makes it possible to increase the film production speed 1.4 times or more than that obtained by the conventional processes for producing a biaxially stretched film (JP-B-62-46337). The blown-film extrusion machine using the specific film cooling apparatus according to the present invention costs 40% to 60% that of the conventional apparatus.

While the invention has been described in detail and with reference to specific examples thereof, it will be apparent to one skilled in the art that various changes and modifications can be made therein without departing from the spirit and scope thereof.

What is claimed is:

1. A process for producing an orientated blown film of a thermoplastic resin by blown film extrusion, comprising blowing air into an extruded bubble of resin extruded from a ring die to expand the bubble and cooling the expanded bubble with air from an externally placed air cooling ring, and at least one rectifying cylinder placed downstream in the direction of film extrusion and expansion, wherein said blown film extrusion is carried out under such conditions that the ratio of (b) the final diameter of the expanded bubble to (a) the diameter of the bubble at the crystallizing temperature of the thermoplastic resin ((b)/(a)) ranges from 1.5 to 10.

2. A process as claimed in claim 1, wherein said ratio ((b)/(a)) is from 2 to 8.

3. A process as claimed in claim 1, wherein said cooling is carried out by using a cooling apparatus provided on the downstream side of the air cooling ring, comprising a plurality of rectifying cylinders having different diameters arrayed at certain intervals in the radial direction concentrically with the ring die to form a ring air chamber with its downstream end open between each two adjacent cylinders, wherein the outermost rectifying cylinder has a plurality of intake vents for intake of open air in a radial manner at a position closer to the air cooling ring than to the downstream end of said outermost rectifying cylinder, and the remaining rectifying cylinders each have a vent in the region of the bottom end (upstream end) thereof so that the air chambers are ventilated, with the height of the rectifying cylinders gradually increasing toward the outermost one so that the downstream ends of the cylinders form a tapered guide for the bubble, and blown film extrusion is carried out in such a manner that the position of said diameter (a) at the crystallizing temperature of the bubble will be upstream of the downstream end of the outermost rectifying cylinder.

4. A process as claimed in claim 3, wherein the position of said diameter (a) of the bubble is within the range of ⅕ to ⅘ the height of the outermost rectifying cylinder from the downstream end thereof.

5. A process as claimed in claim 4, wherein the position of said diameter (a) of the bubble is at a position 5 to 60 cm upstream from the downstream end of the outermost rectifying cylinder.

6. A process as claimed in claim 3, wherein the flow rate of air blown from the air cooling ring is from 0.01 to 50 $m^3/min$.

7. A process as claimed in claim 3, wherein the flow rate of air blown from the air cooling ring is from 5 to 45 $m^3/min$.

8. A process as claimed in claim 3, wherein said cooling is carried out both from the outside of the bubble by means of an air cooling ring and from the inside of the bubble with air blown from an internal cooling cylinder.

9. A process as claimed in claim 8, wherein the flow rate of the air from the air cooling ring is from 0.01 to 50 $m^3/min$ and that from the internal cooling cylinder is from 0.01 to 1 $m^3/min$.

10. A process as claimed in claim 8, wherein the extruded bubble is preliminarily cooled from the outside with a first air cooling ring provided directly below the ring die and then substantially cooled with a second air cooling ring provided below the first air cooling ring, said first and second air cooling rings being coupled via a cylindrical wall surrounding the bubble, and the bubble is also cooled from the inside by means of an internal cooling double cylinder comprising two upright ducts arrayed concentrically with the axis of the ring die, each duct having a plurality of vents for blowing air on the cylinder wall so that air is fed into the inside of the inner duct and blown outside through the passageway formed between the inner and outer ducts.

11. A process as claimed in claim 10, wherein the flow rate of the air from the first air cooling ring is from 0.01 to 40 $m^3/min$, the flow rate of the air from the second air cooling ring is higher than that of the first air cooling ring and ranges from 5 to 50 $m^3/min$, and the flow rate of the air from the internal cooling cylinder is from 0.01 to 3 $m^3/min$.

12. A process as claimed in claim 10, wherein said tapered guide makes an angle of from 45° to 70° with the axis of the orifice.

13. An apparatus suitable for orienting a thermoplastic film prepared by blown film extrusion through a ring die, said ring die being surrounded circumferentially with one or a plurality of concentric cooling air rings, said apparatus comprising:

a plurality of concentric rectifying cylinders each defined by an innermost and outermost wall, the innermost wall of the innermost of said cylinders having a diameter larger than the diameter of the largest of said cooling air rings, the height of the innermost and outermost walls of said cylinders increasing in proportion to the radial distance from said ring die such that the outermost cylinder outermost wall height is greater than the innermost cylinder innermost wall height, each cylinder being open at the end furthest downstream from said ring die, and each cylinder closed at the end furthest upstream, each of said cylinders provided with a venting device connecting the interior of said cylinder to the interior of the next outermost cylinder, the outermost of said cylinders having a plurality of openings in the outermost wall of said outermost cylinder, said openings communicating with the environment surrounding said apparatus, said openings and said venting device(s) located in the respective rectifying cylinder(s) at a position closer to the upstream closed end of the cylinder than the downstream open end of the cylinder wherein said cylinder(s) are concentric about said cooling air ring(s) and are placed downstream in the direction of film extrusion.

* * * * *